ial Patent [19] [11] 4,089,752
Hancock, II [45] May 16, 1978

[54] DISTILLATION COLUMN REACTOR AND PROCESS

[75] Inventor: Allen W. Hancock, II, Media, Pa.

[73] Assignee: Sun Ventures, Inc., Radnor, Pa.

[21] Appl. No.: 718,750

[22] Filed: Aug. 30, 1976

Related U.S. Application Data

[63] Continuation-in-part of Ser. No. 463,493, Apr. 24, 1974, abandoned, and a continuation-in-part of Ser. No. 588,277, Jun. 19, 1975, abandoned.

[51] Int. Cl.² .............................................. B01D 3/20
[52] U.S. Cl. .............................. 203/99; 203/DIG. 6; 202/158; 261/114 R
[58] Field of Search ................. 202/158; 203/DIG. 6; 261/114 R

[56] References Cited

U.S. PATENT DOCUMENTS

| | | | |
|---|---|---|---|
| 1,744,421 | 1/1930 | Stroud, Jr. et al. | 202/158 |
| 1,806,090 | 5/1931 | Seguy | 202/158 |
| 1,854,002 | 4/1932 | Subkow | 202/158 |
| 2,785,961 | 3/1957 | Carter | 261/114 R |
| 2,826,601 | 3/1958 | Barsky | 203/DIG. 6 |
| 2,853,281 | 9/1958 | Hibshman et al. | 202/158 |

Primary Examiner—Norman Yudkoff
Attorney, Agent, or Firm—J. Edward Hess; Donald R. Johnson; Paul Lipsitz

[57] ABSTRACT

A distillation column reactor which provides a relatively long residence time with a minimum drop in pressure which comprises a distillation column containing standard trays with downcomers, a liquid reservoir between the trays, and vapor ports provided through said reservoir, whereby liquid from said downcomers enters said reservoir thereby providing increased liquid residence time in said column.

5 Claims, 1 Drawing Figure

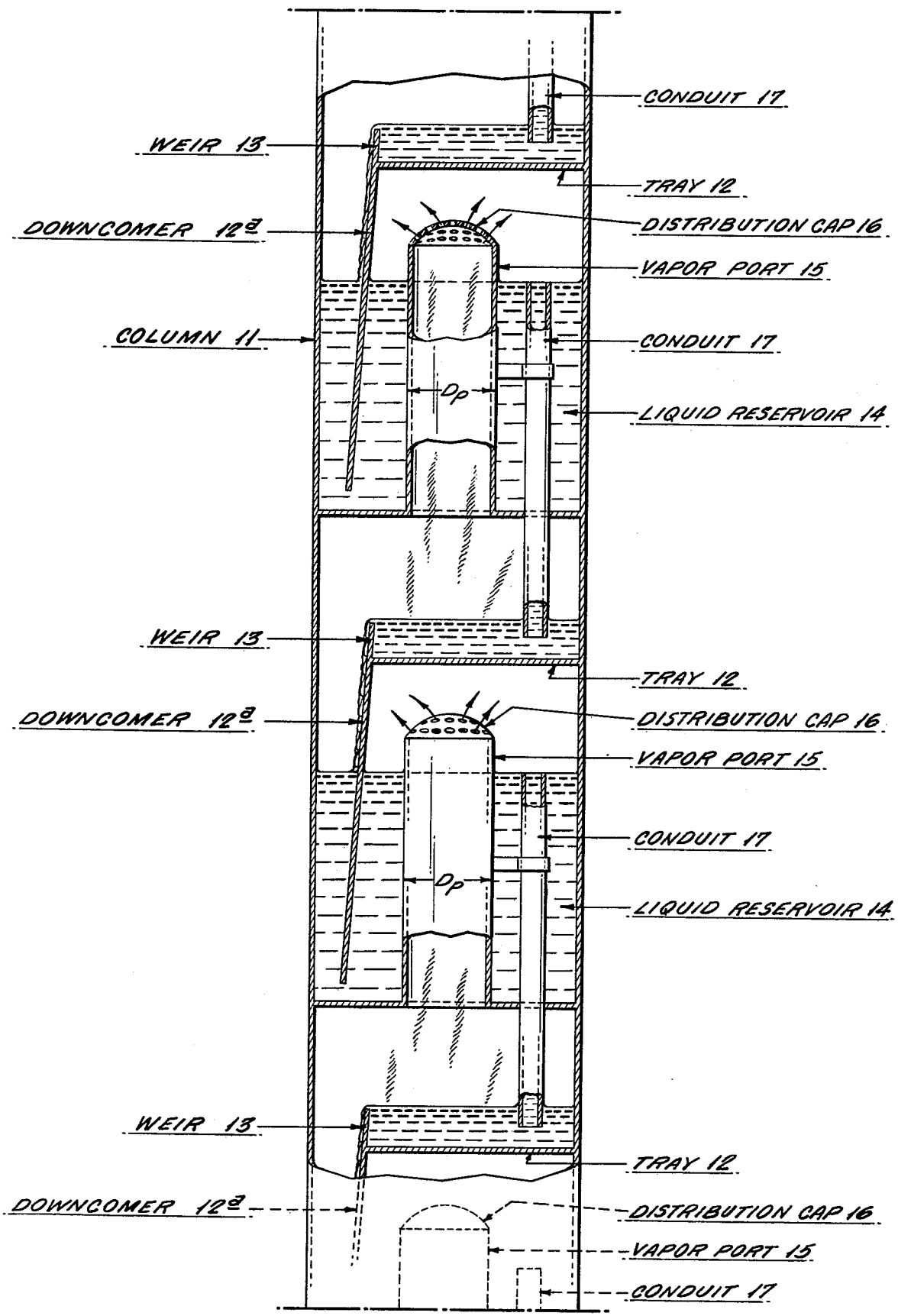

DISTILLATION COLUMN REACTOR AND PROCESS

CROSS REFERENCE TO RELATED APPLICATIONS

This application is a continuation-in-part of Ser. No. 463,493, filed Apr. 24, 1974, now abandoned and a continuation-in-part of Ser. No. 588,277, filed June 19, 1975 now abandoned.

The use of a distillation column for both separation and reaction is known. In particular, use of column in such a dual role is common in esterification where reactions which are equilibrium limited are driven to a high degree of conversion by the continuous removal of one of the reaction products from the reaction zone; e.g., removal of water as vapor from the top of the column. Such a process is disclosed in U.S. Pat. No. 2,384,793 where high molecular weight acids and high molecular weight alcohols are esterified. Also of interest is the process and equipment disclosed in U.S. Pat. No. 3,634,535 where etherification is carried out.

In using such a distillation column reactor it may be desirable that the residence time for the liquid phase be considerably longer than that obtainable with conventional equipment. This situation would occur when the kinetics of the reacting system dictate a total holding time in excess of the usual 1 to 5 minutes.

It is an object of the present invention to provide a distillation column reactor which enables long residence times to be obtained and, further, which does not significantly increase the pressure drop throughout the column. In accord with the invention an improved distillation column reactor comprises a distillation column fitted with conventional trays with downcomers and having a single liquid reservoir of substantial depth between said trays, each of said liquid reservoirs being provided with a vapor port and a conduit through the reservoir to a lower tray, whereby liquid from said downcomer enters said reservoir and after being held in the reservoir for an extended period of time, flows through said conduit in said reservoir to a lower tray, thereby providing increased liquid residence time in said column. The invention also provides a process for carrying out simultaneously fractionation and reaction where conversion of the reactant species requires a longer than usual residence time. In a preferred and specific embodiment, the process is employed for equilibrium limited reactions; e.g., those reactions which are favorably affected by removal of one of the products from the reaction zone and requiring a long residence time for the reactants in order to drive the reaction to completion.

In order to better understand the invention, reference is now made to the FIGURE which shows a multiplicity of superposed conventional trays with downcomers and interdigitated single reservoirs.

As shown in the drawing, a column 11 contains the usual standard tray 12 with downcomer 12a and weir 13. it will be noted that the downcomer 12a extends below the surface of the liquid in the reservoir and preferably will extend, as shown, to almost the bottom of the reservoir. In this way the liquid flowing over the weir 13 is brought to the bottom of the reservoir and thus completely avoids any liquid by-pass which might occur if the downcomer did not extend below the liquid surface; i.e., liquid flowing on the surface of the reservoir to the conduit 17. If desired, baffles may be provided within the reservoir (not shown) to further ensure against by-passing and to create an orderly progression of liquid from the bottom of the downcomer to the top of the conduit 17. It is to be understood, however, that the downcomer need not extend below the liquid surface, but this is preferable as explained above and particularly desirable to avoid liquid by-pass from the surface of the reservoir to the conduit when the column diameter is relatively small. Likewise, it will be understood that for large diameter columns the downcomer need not extend almost to the bottom of the reservoir, but only somewhat below the height of the conduit 17 which conducts liquid from the reservoir to the lower tray as explained below. Below the tray 12 is the liquid reservoir 14 which is filled by the liquid which spills over the weir above it. It will be understood also that a reservoir need not necessarily be below every tray, but that the number of reservoirs will be dictated by the hold up time desired, the capacity of each reservoir, and other parameters of the equipment or process. The reservoir, as indicated by the drawing, has a substantial depth in order to hold a significant volume of liquid, thereby providing a significant increased residence time of the liquid in the system. Each reservoir has one or more vapor ports 15 through which vapor rises from the lower tray to the upper tray and a vapor distributer cap 16 may be employed in the conventional manner if desired. A conduit 17 of predetermined height within the reservoir 14 permits liquid to be returned to the standard tray below when the liquid level in the reservoir reaches the height at which spillover will occur. It will also be understood that adjustment of the height of the conduit 17 in the reservoir will also be a means of controlling reservoir depth and capacity. Furthermore, the downcomer from the standard tray 12 can be designed so as to impart a tangential velocity to the liquid entering the reservoir thereby effecting a modicum of agitation to further enhance mixing. As will be observed from the drawing each reservoir will occupy essentially the entire cross-sectional area of the column, except for the area taken up by the vapor port by-pass 15 and the conduit 17.

It will be understood that vapor-liquid contact in the column occurs between the liquid in the trays and the vapor above them, but there is also contact of the vapor emanating from the by-pass port 15 with the surface of the liquid in the reservoir. Of course, the column functions in the usual manner in that the vapor from the by-pass port 15 is contacted with liquid above, heavy components in the vapor interchange on the tray with light components in the liquid and a new vapor emerges which contains a higher concentration of light components than was present in the vapor from the previous tray. Furthermore, the liquid from the tray traverses the downcomer into the reservoir.

The improved distillation reactor described above will be useful, as indicated, in equilibrium limited reactions which are exemplified by reactions such as esterification, etherification, hydrolysis and the like. A particularly useful application of the system is for the distillation of a terephthalonitrile hydrolysate to remove ammonia from terephthalic acid salts and to simultaneously convert nitrogen containing by-products of the hydrolysis to terephthalic acid. In the operation of the distillation reactor of the invention the regional fractionation time (i.e., the residence time per tray) is short in accord with the usual short contact time between the vapor and the liquid on the standard trays while the reservoirs provide a relatively long residence for the liquid. A major advantage of the system is that no by-passing (e.g., "weeping") of liquid between stages can occur since the only way liquid can pass from the reservoir to the tray below is through the conduit 17. This is extremely important for systems in which high conversion must be obtained.

In order to further illustrate the invention, the following comparative examples are given.

EXAMPLE I (Standard Column)

The feed, $F_o$, to a commercial high pressure/high temperature column is a saturated liquid at 482° F containing:
19131 lb-moles/hr., $H_2O$
765 lb-moles/hr., potentially free $NH_3$
383 lb-moles/hr., non-volatile reactive material The column has 30 trays with the feed to tray number 25. The distillate product is 50 mole percent $H_2O$ and contains 99% of the available $NH_3$.

Assuming constant molal overflow, the molar vapor traffic, V, in the column is given by $$V = D(R_d + 1)$$

where:
$D$ = distillate product rate
$R_d$ = reflux ratio
Setting $R_d = 2.85$ and noting from the above that $D = 1515$ lb-moles/hr., the vapor traffic is $$V = 5833 \text{ lb-moles/hr.}$$

The density of the vapor, $\rho_v$, at the average column temperature of 474° F is approximately 1.15 $lb_m/ft.^3$. Setting the molecular weight of the vapor at 17.5 (50 mole % $H_2O$/50 mole % $NH_3$), the volumetric flowrate, V', is $$V' = V \times 17.5/\rho_v$$
$$= 88763 \text{ cubic ft./hr.}$$

For a superficial velocity, $v$, of 1 ft./sec. the required column diameter, $D_i$, is $$D_i = \sqrt{4V'/\pi 3600\, v}$$
$$= 5.6 \text{ ft.}$$

It is assumed that the overflow weir on each tray will be a chord, the length of which is 75% of the tray diameter. This standard configuration gives an active tray area of about 75% of the total cross-sectional area, $A_1$. Thus, the active area, $A_a$, is $$A_a = 0.75\, A_1 = 0.075\, \pi D_i^2/4$$
$$= 18.5 \text{ sq. ft.}$$

The weir height of the column is set at a usual value of 3 inches. Due to the relatively large amount of liquid traffic (the distillate is only a small portion of the feed, i.e., $(1515/20280)10^2 = 7.5$ mole %) the weir crest is 3.71 inches (calculated by the Francis Weir Equation, Perry, 4th Edition, p. 18–9). Thus, the total effective height on a tray is about 6.71 inches. This leads to an effective volume, H, of $$H = (6.71/12) \times 18.5 = 10.34 \text{ ft.}^3$$

Since the feed is saturated, the liquid traffic, L, in the stripping section is $$L = R_d \times D + F_o$$
$$= 24598 \text{ lb-moles/hr.}$$

As the system is extremely water rich, the molecular weight can be set at 18. The liquid density, $\rho_l$, at the average column temperature is 51 $lb_m/ft.^3$. Thus, the volumetric liquid traffic, L', in the stripping section is $$L' = L \times 18/\rho_l$$
$$= 8682 \text{ ft.}^3/\text{hr.}$$

Therefore, the liquid residence time per tray, $\theta_{tray}$, is $$\theta_{tray} = H/L'$$
$$= 4.3 \text{ secs.}$$

and for 25 trays in the stripping section the total residence time, $\theta_{(tray)total}$, is $$\theta_{(tray)total} = 1.79 \text{ minutes for a column of standard design.}$$

EXAMPLE II

Using the distillation reactor of this invention with a deep liquid reservoir between each standard tray, vapor/liquid contacting does not occur in the reservoir, but the liquid is held for a time sufficient for reaction while the vapor flows through the central large port with only a small drop in pressure. Of course, vapor/liquid contacting does occur on the standard trays thus providing the required fractionation capability.

Setting the diameter of the port 15, $D_p$, at 16 inches, the active area of the reservoir becomes $$A_r = 18.5 - (\pi D_p^2/4)$$
$$= 17.1 \text{ ft.}^2$$

and the volume, $H_r$, of a 5 foot deep reservoir is $$H_r = 5 \times 17.1 = 85.5 \text{ ft.}^3$$

The liquid residence time, $\theta_r$, for the reservoir is then $$\theta_r = 35.5 \text{ secs.}$$

and the total residence time for 25 trays and 25 reservoirs, $\theta_{(tray + r)total}$, is $$\theta_{(tray + r)total} = 16.6 \text{ min.}$$

The major results of the above calculations are summarized in the following table. For completeness the pressure drops associated with the standard column and that of the invention are also included. Thus, it is seen that at the expense of only a marginal increase in pressure drop per stage, the column of the invention gives almost a 10 fold increase in residence time.

TABLE I

| Comparison of Standard Reactive Distillation Column with That of the Invention | | |
|---|---|---|
| | Example I Standard Column | Example II Column of The Invention |
| Superficial Vapor Velocity | | |

TABLE I-continued
Comparison of Standard Reactive Distillation Column with That of the Invention

| | Example I Standard Column | Example II Column of The Invention |
|---|---|---|
| ft/sec | 1 | 1 |
| Liquid Depth, In. | | |
| Trays | | |
| Weir | 3.0 | 3.0 |
| Weir Crest | 3.7 | 3.7 |
| Reservoirs | — | 60.0 |
| Pressure Drop, psi | | |
| Tray | 0.21 | 0.21 |
| Reservoir | — | 0.14 |
| Total/Stage | 0.21 | 0.35 |
| Residence Time in Stripping Section, sec. | | |
| Tray, $\theta_{tray}$ | 4.3 | 4.3 |
| Reservoir, $\theta_r$ | — | 35.5 |
| Total/Stage | 4.3 | 39.8 |
| Total for Column, min. | 1.79 | 16.6 |

The benefit derived from this increase in residence time is demonstrated by the following typical system:

$$A + H_2O \rightleftharpoons B + NH_3$$

When this equilibrium mixture is fed to a distillation column the volatile reaction product, $NH_3$, is removed from the reaction zone and the equilibrium is shifted to the desired product B. This "reactive distillation" sequence can be approximated as a first order irreversible reaction $$A + H_2O \xrightarrow{k} B + NH_3$$

with a rate constant, $k = 0.295$ min.$^{-1}$. Employing the residence times of the standard column (1.79 min.) and of the column of the invention (16.6 min.) as shown above, the conversion of species A in the standard column is 40% whereas in the column of the invention conversion is 99%. Thus, the advantage for increased conversion of the column of the invention is clearly demonstrated.

The invention claimed is:

1. A distillation column reactor to provide increased residence time for liquid reactants with a minimum drop in pressure in said column which comprises a distillation column containing a multiplicity of superposed conventional trays with downcomers and interdigitated single reservoirs, the latter having therewithin means providing each of said reservoirs with substantial depth to hold liquid substantially out of contact with vapor, each of said reservoirs between an adjacent pair of trays occupying essentially the entire cross-sectional area of the column save for the area occupied by a vapor bypass means and an open ended conduit extending through the bottom of said reservoir to a substantial height thereabove, said vapor by-pass means permitting vapors to flow through said by-pass from the tray below said by-pass to the tray above, said conduit extending from a predetermined substantial height above the bottom of its reservoir to below its reservoir wherein said conduit effects flow of liquid from the top of the liquid surface of said reservoir to the tray below said reservoir.

2. A distillation column reactor to provide increased residence time for liquid reactants with a minimum drop in pressure in said column which comprises a distillation column containing a multiplicity of superposed conventional trays with downcomers and interdigitated single reservoirs, the latter having therewithin means providing each of said reservoirs with substantial depth to hold liquid substantially out of contact with vapor, each of said reservoirs between an adjacent pair of trays occupying essentially the entire cross-sectional area of the column save for the area occupied by a vapor bypass means and an open ended conduit extending through said reservoir whose top is above the bottom of said downcomer, said vapor by-pass means permitting vapors to flow through said by-pass from the tray below said by-pass to the tray above, said conduit extending from a predetermined substantial height above the bottom of its reservoir to below its reservoir wherein said conduit effects flow of liquid from the top of the liquid surface of said reservoir to the tray below said reservoir.

3. A distillation column reactor to provide increased residence time for reactants with a minimum drop in pressure in said column which comprises effecting said reaction in a distillation column containing a multiplicity of superposed conventional trays with downcomers and interdigitated single reservoirs, the downcomers of said trays extending to near the bottom of said reservoirs, the latter having therewithin means providing each of said reservoirs with substantial depth to hold liquid substantially out of contact with vapor, each of said reservoirs between an adjacent pair of trays occupying essentially the entire cross-sectional area of the column save for the area occupied by a vapor by-pass means and an open ended conduit extending through said reservoir to a substantial height above the bottom of said reservoir, said vapor by-pass means permitting vapors to flow through said by-pass from the tray below said by-pass to the tray above, said conduit extending from a predetermined substantial height above the bottom of its reservoir to below its reservoir, said conduit effecting flow of liquid from the top of the liquid surface of said reservoir to the tray below said reservoir.

4. A process for carrying out reactions in a distillation column reactor to provide increased residence time for reactants with a minimum drop in pressure in said column which comprises effecting said reaction in a distillation column containing a multiplicity of superposed conventional trays with downcomers and interdigitated single reservoirs, the downcomers of said trays extending to near the bottom of said reservoirs, the latter having therewithin means providing each of said reservoirs with substantial depth to hold liquid substantially out of contact with vapor, each of said reservoirs between an adjacent pair of trays occupying essentially the entire cross-sectional area of the column save for the area occupied by a vapor by-pass means and an open ended conduit extending through said reservoir to a substantial height above the bottom of said reservoir, said vapor by-pass means permitting vapors to flow through said by-pass from the tray below said by-pass to the tray above, said conduit extending from a predetermined substantial height above the bottom of its reservoir to below its reservoir, said conduit effecting flow of liquid from the top of the liquid surface of said reservoir to the tray below said reservoir.

5. The process of claim 4 wherein the reactants in said column are the nitrogen-containing by-products obtained in the hydrolysis of terephthalonitrile.

* * * * *